United States Patent Office 3,834,961
Patented Sept. 10, 1974

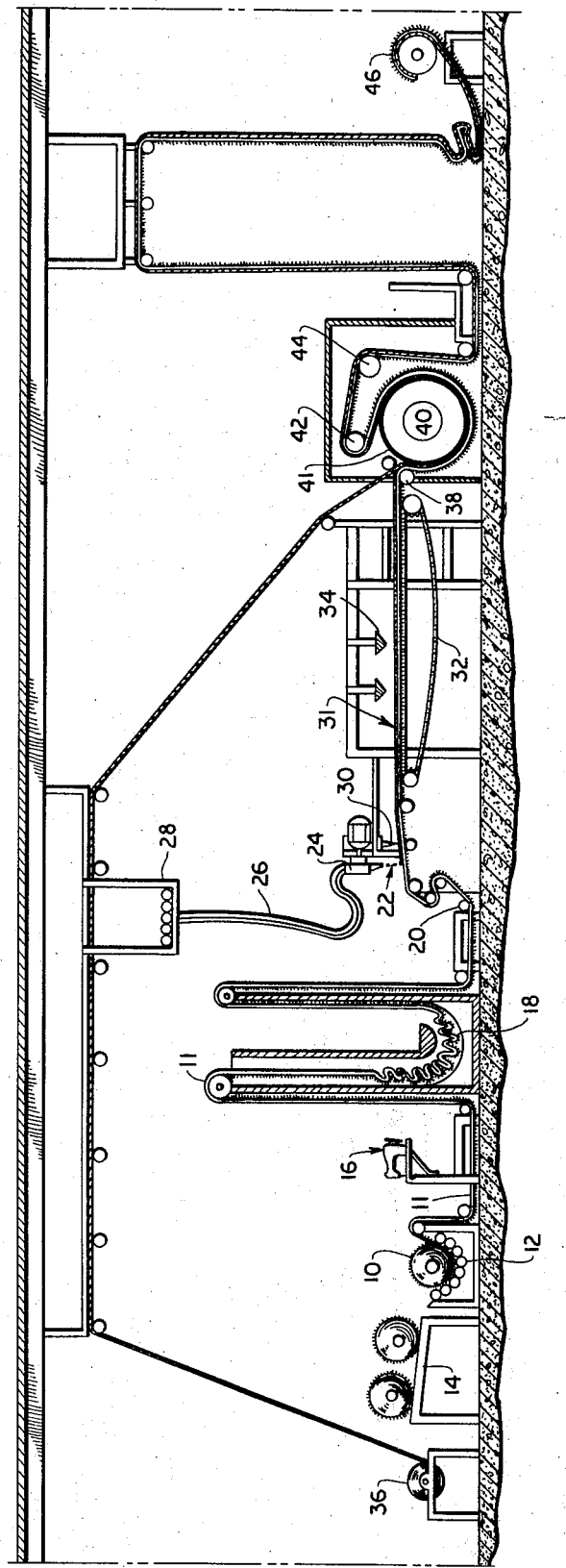

3,834,961
METHOD OF PROMOTING SEPARATION BETWEEN A HEATED CURING SURFACE AND A BACKING MATERIAL
C. Edward Terry, Rockmart, Ga., assignor to Textile Rubber and Chemical Company, Inc., Dalton, Ga.
Continuation-in-part of application Ser. No. 197,022, Nov. 9, 1971, now Patent No. 3,806,385, which is a continuation-in-part of application Ser. No. 112,472, Feb. 3, 1971, now Patent No. 3,705,834, which in turn is a continuation-in-part of application Ser. No. 111,860, Feb. 2, 1971, now Patent No. 3,700,515. This application Jan. 24, 1973, Ser. No. 326,232
The portion of the term of the patent subsequent to Oct. 24, 1989, has been disclaimed
Int. Cl. D05c 15/00
U.S. Cl. 156—72   9 Claims

ABSTRACT OF THE DISCLOSURE

A urethane carpet backing material is cured on the heated surface of at least one heated drum. The surface of the drum is provided with a nonstick release agent to prevent or minimize any tendency of the carpet material to stick or adhere to the heated surface, and to permit the carpet material to be readily separated from the drum without damaging the urethane backing material or the surface of the drum. In the preferred embodiment, the urethane backing material serves as an adhesive between a tufted primary backing and a secondary backing. In an optional embodiment, the urethane backing material serves as an integral adhesive and secondary backing. When serving as an integral adhesive and secondary backing, foam cells in the urethane may be crushed to produce a relatively hard back for the carpet product or the cells may remain in the urethane to produce a relatively soft and cushioned back for the carpet product.

CROSS-REFERENCE TO RELATED APPLICATION

This application is a continuation-in-part of my copending application Ser. No. 197,022, filed Nov. 9, 1971 and entitled "Method of Applying a Secondary Backing Material to Previously Tuffed Primary Backing Material," now Pat. No. 3,806,385 which is a continuation-in-part of my copending application Ser. No. 112,472 filed Feb. 3, 1971 and entitled "Carpet With a Foam Polyurethane Backing," now Pat. No. 3,705,834 which is in turn a continuation-in-part of my copending application Ser. No. 111,860 filed Feb. 2, 1971 entitled "Method of Applying a Backing to a Carpet and Product," now Pat. No. 3,700,515.

This invention relates to a method of applying a urethane backing material to a previously tufted primary backing material and curing the urethane material with a rotating heated drum including a nonstick heated surface. More particularly, the invention concerns the use of an adhesive system which may be made to polymerize and set or cure during a relatively short period of time and at either ambient or elevated temperatures.

Presently, the large majority of the world's carpets and carpet-type materials are prepared by a tufting process whereby yarn is interlaced through a primary backing material so that a portion of the yarn known as the bundle protrudes through the underside of the primary backing. After the interlacing step, a secondary backing, generally jute, is adhesively applied and secured to the underside of the primary backing to cover the bundle and provide dimensional stability and drape while enhancing the tuft lock of the yarn, i.e. the strength with which the tufted yarn is retained by the primary backing. Conventionally, the adhesive used to laminate the secondary backing to the underside of the primary backing includes latex materials and a solvent system and/or a significant quantity of water. The solvent and/or water must be removed after application of the adhesive and polymerization and curing of the adhesive must be accomplished. Such an operation has in the past required the usage of relatively expensive and complicated drying equipment. In addition, this conventional equipment normally occupied relatively large expanses of floor space and required great lengths of time to effectively and efficiently complete a drying operation.

To be suitable for usage in carpet backing laminations an adhesive must retain tufted yarn in place, secure the individual fibers of the yarn in position, prevent pilling of the yarn, control dimensional stability (hand and drape) and retain the secondary backing securely to the underside of the primary backing material. Also, it is extremely important that the adhesive not migrate through the primary backing and into the exposed portions of the tufted yarn. If such migration occurs, the yarn becomes stiff and the final carpet will be unacceptable.

Presently, a widely-used adhesive system is based upon a latex or a carboxylated latex that is applied to the underside of the primary backing. The water in the latex system will on occasion migrate through the primary backing into the exposed yarn, but the adhesive is retained by the primary backing and the bundle. The latex adhesive is then cured after application and the final carpet is dried in conventional large ovens at relatively elevated temperatures. The curing and drying process is quite costly due to the large expense of the ovens, energy requirement, floor space requirements and labor to operate the ovens.

It is an object of the present invention therefore, to provide a process for curing a urethane backing material through the use of relatively inexpensive equipment which requires only moderate lengths of time and low temperatures for curing.

It is another object of the present invention to provide a process for manufacturing an article by laminating a backing material to a previously tufted material through the use of relatively inexpensive equipment which requires only moderate lengths of time and low temperatures for curing of the adhesive system and which prevents unwanted sticking between the backing material and a heated surface for curing the adhesive system.

Other objects, features and advantages of the present invention will become apparent from a review of the following detailed description when taken in conjunction with the accompanying drawing wherein:

The figure represents in schematic form one embodiment of the equipment required for the present process.

In accordance with the present invention, there is provided a process for curing a urethane backing material during the preparation of a tufted carpet product. The hereindisclosed embodiment of the present invention teaches the lamination of a secondary backing material to a previously tufted primary backing material, although the urethane backing material and the nonstick curing feature are applicable in the manufacture of an article having only a single backing material. As shown in the figure of the drawing, a supply 10 of previously tufted primary jute-backing material 11 in roll form is positioned upon a carpet unroll cradle 12 which is immediately adjacent a carpet storage table 14. The previously tufted primary backing material is fed from cradle 12 past a railway sew-on station 16 to a storage area 18. Railway sew-on station 16 is used in joining consecutive rolls of primary backing material so that the operation of the process may be continuous even though different types of carpet material are fed through the system. Storage area 18 provides an accumulation of primary backing material so that the railway sew-on equipment may have sufficient time to accomplish the joining of adjacent rolls of primary backing material.

Following storage station 18, the primary backing material 11 is fed over a series of rollers 20 to adhesive application station 22. At this station, a traversing mixing head and applicator 24 applies a supply of urethane material to the back and bundle of primary backing material. Traversing head 24 is caused to traverse in reciprocal fashion across the width of backing material through conventional traversing operation equipment 25. Urethane material is supplied to head 24 from reservoir 28 through supply conduit 26.

Immediately following application of urethane material, the primary backing material including the cost of adhesive passes under doctor blade 30 which serves to evenly distribute and regulate the thickness of adhesive material upon the backing material. The coated primary backing material is then passed across a tenter section 31 including endless belt 32. Through the movement of belt 32 and the operation of the tenter section, this section of the process serves to stretch and retain the coated backing material in a proper position for an adhesive dwell time period as discussed later in this specification.

A pair of optional pre-heaters 34 are provided immediately above the tenter section of the process. If desirable, these heaters may be actuated to provide a degree of initial curing for the urethane. In a preferred operation, the preheaters are not necessary and are not required.

A supply of jute secondary backing is passed from a remote jute let-off station 36 to be positioned immediately adjacent the coated primary backing material for adhesion thereto following the tenter section of the process. The secondary backing and primary backing then pass through a pair of pinch rolls 38 which supply sufficient compressive force to bear the two backing materials against one another. The force of the pinch rolls may be adjusted to crush substantially all of the cells formed in the foaming of the urethane, or the rolls may only bear the two backings together but leave a portion of the cells intact. Following the pinch rolls, the carpet material of secondary backing and tufted primary backing is passed around a portion of the circumference of at least one heated rotating drying drum 40. During passage around the drying drum 40, the secondary backing is positioned immediately adjacent the drum surface so that the heat supplied by the drum will be most immediately available to the urethane material. The supply of carpet is passed around rollers 42 which serve to position the carpet material against the heating drum. The carpet material is then removed across further rollers 44 and collected at a roll-up station 46. If desirable, suitable trimming stations may be positioned immediately adjacent the drying drum 40 to trim the carpet to a desired width. In addition, cooling areas may also be provied for reduction in temperature of the carpet material.

The circumferential surface of the drum 40 is provided with a coating 41 of a release agent which adheres to the drum surface and which is selected to exhibit non-stick release properties with respect to the secondary backing material positioned against the coating. Preferred materials for the coating 41 include silicon mold release agents, silicon rubber, polytetrafluoroethylene, polytetrafluoroethylene-coated glass fiber tape, and sintered polytetrafluoroethylene. An especially preferred coating 41 is polytetrafluoroethylene-coated glass fiber adhesive tape.

During application of the urethane material to the primary backing material, it has been found that a suitable concentration of urethane is between 4 and 42 ounces of adhesive material per square yard of backing material. A preferred concentration is between 12 and 18 ounces of urethane material per square yard of backing material and a particularly preferred concentration is between 14 and 16 ounces of urethane material per square yard of backing material.

While the coated backing material is passing through the tenter section, a dwell time of between 5 seconds and 30 minutes for the urethane material is provided. Preferably this dwell time is less than one minute. During this dwell time, the urethane material chemically expands during the preliminary stage of its polymerization reaction and is absorbed by the bundle of exposed yarn on the primary backing material to achieve wrap thereof. Approximately 60% bundle wrap is obtained during the dwell period. When the carpet material reaches the heating drums and the temperature of the urethane is elevated, viscosity of the urethane drops and 100% bundle wrap is achieved.

The time and temperature factors provided by the heating drum 40 are particularly critical to the operation of the present process. It has been found that temperatures of between about 70° and 300° F. are suitable for the operation of the present process. Preferred temperatures are between 100° and 250° F. The time of heating for the carpet material has been found to be suitable when in the range of between 10 minutes and 10 seconds. A preferred range for heating time is between 8 minutes and 30 seconds. It may be seen that with the present process it is possible to use temperatures which are low enough to preserve the integrity of conventional synthetic carpet fibers.

Typical running times from the doctor blade 30 to exit from the heating drum 40 for the present process is approximately ¾ of one minute to aproximately 3 minutes. This may be compared with conventional running times of between 30 minutes and several hours. In addition, with this equipment running speeds may be as high as 60 feet a minute while with conventional equipment running speeds of between 8 and 12 feet are generally available.

A particularly critical aspect of that portion of the present invention pertaining to the method of applying a secondary backing material to previously tufted primary backing is the nature of the urethane backing material. In this process a urethane adhesive system is employed as the urethane backing material. This system is stable under conventional materials handling conditions but may be made to polymerize and set or cure during a short period of time at from ambient up to elevated temperatures.

A urethane adhesive system of this process is a thixotropic polymerization product of a mixture of a polyol having a hydroxyl number less than one hundred, optionally a small amount of water, a polyisocyanate, a thixotropic filler and a catalyst system that promotes a polymerization reaction between the isocyanate and the polyol to form a polyurethane within a short time after mixing. Penetration of the thixotropic polyurethane composition into the bundle of exposed carpet yarn is controlled by regulating carefully its initial viscosity, its thixotropicity, its pot life, and the amount of adhesive expansion during reaction so that the bundle of yarn is at least 90 percent saturated with polyurethane adhesive without significant penetration through the primary backing and into the exposed portions of the tufted carpet yarn.

The thixotropic polyurethane composition is prepared by charging an aqueous polyol composition and a polyisocyanate composition separately to reservoir 28 where the reactants are intimately mixed. Before a significant degree of polymerization and blowing occurs, the resultant mixture is evenly applied to the underside of the primary backing material by means of mixing head 24 and doctor blade 30. The thixotropic nature of the polyurethane reaction product in combination with the sheer forces created by application of the mixture with a doctor blade causes a sufficient reduction in the viscosity of the blend of reactants and product to promote spreading thereof. A polymerization reaction between the polyisocyanate, optional water and polyol is initiated when the reactants are mixed so that the reaction occurs both prior to and after the mixture-composition passes under the doctor blade. After passing the blade, the mixture-composition thickens due to its thixotropic nature so that migration of the composition into the tufted yarn on the upper side of the primary backing is prevented. The optional small amount of water in the composition besides promoting the polymerization also causes controlled foaming to improve adhesive migration into the bund'e of yarn before the composition is cured and reduces the amount of composition needed to attain desired adhesion for the secondary backing.

The thixotropic polyurethane material must have a Brookfield viscosity of between about 30,000 and 100,000 c.p.s. as measured at 10 r.p.m. #7 spindle on a Brookfield RVF viscometer to prevent migration thereof into the exposed yarn while permitting it to liquify sufficiently under application of force and be spread by means of a doctor blade. The Brookfield viscometer and its operation is described in "Development of Research Technique for Evaulating the Low Temperature Fluidity of Automatic Transmission Fluids," published by Coordinating Research Council, Inc., February, 1963, Appendix A, and designated as CRC L–45–1262. It has been found that migration cannot be prevented merely by increasing the viscosity of the composition but that it is necessary that the composition be thixotropic. In order to attain these characteristics, it is essential that the polyol employed have a hydroxyl number less than one hundred, preferably less than fifty. As is well known in the art, the hydroxyl number is defined a sthe number of milligrams of potassium hydroxide required for the complete neutralization of the hydrolysis product of the fully acetylated derivative prepared from one gram of polyether polyol. It is necessary that the polyol have a low hydroxyl number to reduce the concentration of the diisocyanate needed to effect complete reaction of the reactants to form the polyurethane. When employing liquid diisocyanates, increased amounts of diisocyanate reduce the viscosity and thixotropicity of the resultant composition below that desired to prevent migration of the composition into the exposed yarn. On the other hand, when a solid diisocyanate reactant is employed, increased amounts thereof will cause the resultant composition to be paste-like rendering it very difficult to spread. Accordingly, while low molecular weight polyols can be employed with solid diisocyanates and high molecular weight polyols can be employed with liquid diisocyanates, in each case the hydroxyl number of the polyol must be low to attain proper physical characteristics of the resultant composition. Accordingly, when employing solid diisocyanate reactants, the polyol should have a molecular weight between about 1000 and 3000 to attain the proper viscosity characteristics of the resultant composition. On the other hand, when the liquid diisocyanate reactant is employed, the polyol should have a molecular weight of between about 3000 and about 9000 to attain the desired viscosity characteristics of the resultant composition.

While careful selection of the polyol or prepolymer and the diisocyanate provide a means for controlling the viscosity of the resultant composition, the composition cannot be made thixotropic to the desired degree by controlling the relative concentrations of only these two reactants. A suitable filler must be added in amounts sufficient to render the overall composition thixotropic to the desired degree but less than that which will cause the composition to become excessively viscous and paste-like.

The concentration of filler is dependent upon the type of filler employed since the degree of thixotropicity varies with the filler used. Generally, the filler is employed in amounts of between about 15 and 300 parts per one hundred parts of polyol or prepolymer reactant. Representative suitable fillers include silica, asbestos, calcium carbonate, zinc oxide, clay, feldspar, or the like, or mixtures thereof. When fillers are employed, such as silica or calcium carbonate, it is preferred that additional fillers be added to attain the desired level of thixotropicity. It is preferred to employ asbestos powder as the filler either alone or in conjunction with another filler such as calcium carbonate as satisfactory thixotropic characteristics are achieved with asbestos and it additionally reduces the flamability of the composition.

The type of catalyst system employed in preparation of the thixotropic polyurethane composition should regulate the pot life (i.e., the time for a 100 percent viscosity increase) thereof to between 10 and about 60 seconds at moderate temperatures of up to about 23° C. It is preferred that from .03 to one part of catalyst per one hundred parts of polyol be used in the reaction mixture.

Blowing or foaming the polyurethane composition is effected by controlling both the catalyst system and the water concentration. Generally, water may be present in the reaction mass from between about .01 and .75 parts per hundred parts polyol, over and above the water normally present as absorbed on the fil'er. The catalyst system not only must effect rapid curing at ambient or elevated temperatures but also must control formation of carbon dioxide resulting from the reaction of water and diisocyanate. Blowing should be controlled to effect adhesive expansion between about 100 percent and 400 percent, preferably between about 200 percent and 300 percent, so that the bundle of yarn is saturated with adhesive. Suitable catalysts are those which promote polyurethane formation at a high rate but do not promote the blowing reaction in preference to the polyurethane reaction. Preferred catalysts are organic metal compounds, amines, and metal soaps; such catalysts include dibutyl tin dilaurate, stannous octoate and nickel acetyl-acetonate.

Suitable polyols which can be employed in the present invention are the polyether polyols having a functionality of at least two, an average molecular weight between about 1000 and 9000 and a hydroxyl number less than one hundred. Such polyols include polybutylene glycol, polyethylene glycol, polypropylene glycol, 1,2-polydimethylene glycol, polydecamethylene glycol and mixtures thereof. When using a liquid diisocyanate reactant, preferred polyols have an average molecular weight of between 4000 and 8000, and particularly preferred polyols have a molecular weight of between 6000 and 7000. When using a solid diisocyanate reactant, preferred polyols have an average molecular weight of between 1200 and 2800, and particularly preferred polyols have a molecular weight of between 1500 and 2500.

A variety of polyisocyanates may be reacted with these polyols to obtain satisfactory polyurethane adhesives. Particularly suitable polyisocyanates are aromatic diisocyanates as they are more reactive and less toxic than the aliphatic diisocyanates. Such diisocyanates include 2,4-toluene diisocyanate, 2,6-toluene diisocyanate, methane diisocyanate, naphthylene 1,4-diisocyanate, diphenylmethane-4,4'-diisocyanate, 3,3'-dimethoxy biphenylene diisocyanate, 4,4-diphenylene diisocyanate and mixtures thereof. The diisocyanate usually is employed in stoichiometric excess to assure complete reaction with the functional groups of the polyol and with the water which is present. Preferably from 18 to 50 parts of diisocyanate per one hundred parts of polyol are used in the reaction mass.

Preferably the polyisocyanate component of the present invention is a polymethylene polyphenyl isocyanate such as the undistilled product derived from an aniline-formaldehyde condensation reaction and subsequent phosgenation. Such a product includes diphenylmethane-4,4'-diisocyanate and its analogs with a functionality between two and three. Two of these materials are as follows:

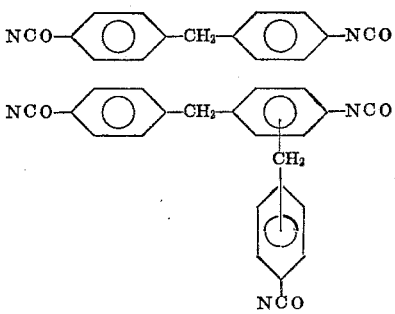

The undistilled product has a relatively low vapor hazard associated with the product (less than 5 torr at 200° C.). In addition, the undistilled product imparts improved heat and flame resistance in foams when compared to toluene diisocyanate.

The polyisocyanate component of this invention may also be supplied to the mixture in the form of a prepolymer as is conventional. The prepolymer is formed by reacting a stoichemetric excess of the isocyanate with the polymeric hydroxy compound. Typically the isocyanate is employed in proportions of from about 30 percent to about 200 percent stoichemetric excess. The stoichiometry in this instance being based upon equivalents of isocyanate group per equivalent of hydroxyl groups in the polymeric hydroxy compound.

Depending upon the desired characteristics of the foam it may be advantageous to block some of the isocyanate groups of the polyisocyanates with a mono-functional organic compound such as a phenol. Blocking techniques permit adjustment of the availability of the more highly reactive isocyanate groups and adjustment of the polymerizing or curing temperature of the froth. One or any number of isocyanate groups may be blocked to provide the degree of reactivity desired. In addition, particular catalysts may be employed to adjust the splitting or unblocking temperature desired.

The amount of polyisocyanate employed will vary slightly depending upon the nature of the polyurethane being prepared. In general, the —NCO equivalent to total active hydrogen equivalent should be such as to provide a ratio of 0.8 to 2.0 equivalents of —NCO per equivalent of active hydrogen, i.e., hydroxyl hydrogen of the polyol compound. Preferably the ratio is about 1.0 to 1.5 equivalents of —NCO per equivalent of active hydrogen.

In a particularly preferred embodiment of the present invention the polymethylene polyphenyl isocyanate component is transformed, prior to mixture with the polyhydroxy compound, into a storage stable liquid by heating at 160° C. to 250° C. with 0.1% to 3% by weight (based on the weight of the isocyanate) of a trihydrocarbyl phosphate. Preferred trihydrocarbyl phosphates are the trialkylphosphates wherein the akyl radical contains from one to twelve carbon atoms, inclusive, such as methyl, ethyl, propyl, butyl, pentyl, hexyl, heptyl, octyl, nonyl, decyl, undecyl, dodecyl, and the isomeric forms thereof. The particularly preferred trialkyl phosphate is triethyl phosphate and the particularly preferred polymethylene polyphenyl isocyanate in this embodiment is substantially pure diphenylmethane diisocyanate. By substantially pure diphenylmethane diisocyanate, as the term is employed in this specification, we mean a diphenylmethane diisocyanate which is substantially free from, i.e. containing less than about 5% by weight of, polyisocyanates of higher functionality. The substantially pure material normally contains approximately 90% of diphenylmethane-4,4'-diisocyanate and about 10% of the corresponding 2,4'-isomer. It should be understood that this embodiment is not limited to this particular proportion of isomers but includes the use of other proportions and the use of the individual pure 4,4- and 2,4' isomers which are substantially free of polyisocyanates of higher functionality.

Another method of preparation of the polyurethane adhesive is possible and practical. By addition of from one to three parts of selected surfactants or surface additive agents per one hundred parts of polyol rather than water, it is possible to mechanically froth or entrain air into the polyurethane compound rather than chemically foam the compound and produce a stable froth of air and polyurethane adhesive. A general formulation for preparation of said adhesive is:

| Material: | Parts |
| --- | --- |
| Poly or (other hydroxyl containing material) | 100.00 |
| Asbestos | 10.00 |
| Dibutyl tin dilaurate | .06 |
| Surfactant | 3.00 |
| Colorant | .50 |
| Diisocyanate | 30.00 |

The froth of the above formulation is applied by suitable doctoring means to the underside of a tufted primary backing, jelled and then cured as described previously. Suitable surfactants include silicon surfactant compounds from Union Carbide Company and Dow Chemical Company.

The present invention will be described further by the following examples.

EXAMPLE I

To a mixing head apparatus adapted to spread a mixture onto the underside of a tufted primary backing material are separately charged (1) 100.0 pounds of polypropylene glycol having a hydroxyl number of about twenty-five and a molecular weight of 6500; 0.50 pounds of water; 15.0 pounds of asbestos powder having an average particle size of about 5–50 microns; 100.0 pounds of calcium carbonate having an average particle size of about 50–150 microns; and 0.05 pounds of dibutyl tin dilaurate and (2) 30 liquid pounds of transformed diphenylmethane-4-4 diisocyanate. The resultant mixture has an initial viscosity of about 88,000 when measured on a Brookfield viscometer with spindle No. 7 at 10 r.p.m., RVF. A primary backing material, through which nylon yarn has been tufted, is then fed under the mixing head. The thixotropic polyurethane mixture is applied to the primary backing and exposed bundle of yarn at a rate of 18 ounces of mixture per square yard of backing by means of a doctor blade and allowed to foam to a general thickness of approximately ¼ of an inch. A secondary backing is then applied to the layer of adhesive and the combination of primary backing and secondary backing is then passed between two pinch rollers where the backings and the adhesive are subjected to a pressure of about 4 p.s.i. to crush substantially all the cells formed in the adhesive during the foaming thereof. The resulting laminate of primary backing and secondary backing is then passed over a portion of the circumference of a series of a heating drum where heat at 135° C. is applied to the secondary backing to set and cure the adhesive material. The heated drum is covered on its heating surface with a polytetrafluoroethylene-coated glass fiber adhesive tape. The carpet product is released from the drum with no sticking.

The resulting laminated carpet product is then tested for strength by the delamination, bundle wrap and tuft lock tests. The carpet is found to have a tuft lock of about 25 pounds. The bundle wrap is found to be about 100% saturated with polyurethane adhesive and there is no migration of the polyurethane past the primary backing.

EXAMPLE II

The following general formulation,

| Material: | Pounds |
|---|---|
| Triol polyethylene glycol (M.W. 6,000) | 100.00 |
| Asbestos | 10.00 |
| Filler (calcium carbonate) | 75.00 |
| Dibutyl tin dilaurate | 0.03 |
| Silicon surfactant (Dow Chemical Company) | 3.00 |
| A diisocyanate prepolymer of the diisocyante of Example I and polypropylene glycol; the prepolymer provides a free NCO percentage of approximately 34% with an isocyanate equivalent of approximately 140 | 31.00 | is metered and blended with dry air in the head of a mechanical frothing machine, such as is conventionally employed to froth latex, candies, and food products. The agitation produced in the frothing head produces an adhesive-air froth of approximately 17 pounds per cubic foot density. This froth is poured into a puddle behind a doctoring blade which meters approximately 38 ounces per square yard at about 3/8 of an inch thick onto the carpet backing. The adhesive compound is then cured as described in Example I.

It should be understood that conventional backing materials which may be used in this process inilude woven jute, cotton and synthetic fiber backings, woven strips of polyolefin material, sheets of polyolefin material, needled and non-woven backing materials and the like. Conventional carpet yarns for use in this process include natural fibers such as cotton and wool and synthetic fibers such as nylon, polyester, polyolefin and the like.

In an optional embodiment of this process, the secondary backing is eliminated all together and the urethane backing material is permitted to foam in place and is then cured by being positioned next to the drying drum 40 with the foamed urethane immediately adjacent to the heated surface of the drum as covered by a polytetrafluoroethylene-coated glass fiber adhesive tape. Rather than having the urethane material foam in place, the urethane material may be mechanically frothed prior to application to the tufted backing as in Example II and then cured by being positioned adjacent the heated surface of the drying drum 40. When frothing the urethane, the water content of the system may be reduced to a very low figure.

In this optional embodiment, the foam cells, whether mechanically created or blown by chemical reaction, may be either crushed or not crushed. If the cells are crushed, a more rigid backing is obtained. If the cells are not crushed, a more soft and resilient back is obtained. Various designs may be impressed into the backing of this embodiment when total or partial crushing of cells is performed.

While this invention has been described in detail with particular reference to preferred embodiments thereof, it will be understood that variations and modifications can be effected within the spirit and scope of the invention as described hereinbefore and as defined in the appended claims.

What is claimed is:

1. Process for preparing a tufted carpet product including a primary backing having carpet yarn interlaced therethrough to provide an upperside of the backing which presents a major portion of the interlaced yarn and an underside of the backing which presents the bundle of carpet yarn, a secondary backing, and a layer of adhesive material between the underside of the primary backing and the secondary backing for securing the two backings together, said process comprising the steps of:
passing the underside of the primary backing past an application station where a thixotropic polyurethane adhesive construction material is applied to the underside of the primary backing and the bundle of carpet yarn;
applying a secondary backing to the underside of the primary backing and the adhesive material with sufficient force to cause bonding between the two backings; and
supplying heat to the secondary backing and adhesive material at a temperature of from about 70° F. to about 300° F. for a period of about 10 seconds to about 10 minutes to cause polymerization and curing of the adhesive material by passing the secondary backing and primary backing around a portion of the circumferential surface of at least one rotating heated drum having a nonstick release agent disposed on said surface, with the secondary backing being positioned immediately adjacent said surface of the heated drum.

2. Process of Claim 1, wherein said nonstick release agent is selected from the group consisting of silicon rubber silicon, polytetrafluoroethylene, and sintered polytetrafluoroethylene.

3. Process of Claim 1, wherein said nonstick release agent is a polytetrafluoroethylene-coated glass fiber adhesive tape.

4. Process of Claim 1, wherein the thixotropic polyurethane adhesive construction material comprises a polyol, a diisocyanate and a filler and the polyol is selected from the group consisting of polybutylene glycol, polyethylene glycol, 1,2-polydimethylene glycol, polydecamethylene glycol, and mixtures thereof; the diisocyanate is aromatic and is selected from the group consisting of 2,4-toluene diisocyanate, 2,6-toluene diisocyanate, methane diisocyanate, naphthylene 1,4-diisocyanate, diphenylmethane-4,4'-diisocyanate, 3,3'-dimethoxy biphenylene diisocyanate, 4-4-diphenylene diisocyanate and mixtures thereof; the filler is selected from the group consisting of silica, asbestos, calcium carbonate, zinc oxide, clay, feldspar and mixtures thereof; and the reaction mass includes sufficient water to effect between 100 percent and 400 percent chemical expansion of the composition during reaction of the polyol and the diisocyanate.

5. Process of Claim 1, wherein from one to three parts of a surfactant are included in the polyurethane adhesive material and the adhesive material is mechanically agitated with the addition of dry air prior to application of the adhesive material to the primary backing.

6. Process for preparing a tufted carpet product including a substrate having interlaced carpet yarn to provide an upperside which presents a major portion of the interlaced yarn and an underside which presents a bundle of carpet yarn, and a layer of urethane backing material on the underside of the substrate, said process comprising the steps of:
passing the underside of the substrate past an application station where a thixotropic polyurethane backing material is applied to the underside of the substrate and the bundle of carpet yarn; and
supplying heat to the substrate and backing material at a temperature of from about 70° F. to about 300° F. for a period of about 10 seconds to about 10 minutes to cause polymerization and curing of the backing material by passing the substrate and the backing material around a portion of the circumferential surface of at least one rotating heated drum having a nonstick release agent disposed on said surface, with the backing material being positioned immediately adjacent said surface of the heated drum.

7. Process of Claim 6, wherein said nonstick release agent comprises polytetrafluoroethylene.

8. Process for preparing a tufted carpet product comprising the steps of:
passing a previously tufted product having an underside including a bundle of carpet yarn from a supply roll, through an accumulation station, and past an application station where a urethane construction material is applied to the underside of the tufted product and bundle of yarn and doctored to a uniform thickness;

passing the tufted product including the urethane material through a tenter section where the tufted product is stretched to a determinable size and the urethane material expands as its polymerization reaction progresses;

applying a substrate to the underside of the tufted product and the adhesive material with sufficient force to cause bonding between the substrate and the tufted product;

supplying heat at a temperature of 70° F. to 300° F. to the substrate and the adhesive material by passing the substrate and tufted product around a portion of the circumferential surface of at least one rotating heated drum having a nonstick release agent disposed on the surface of the drum with the substrate being positioned immediately adjacent the surface of the heated drums; and collecting the substrate and tufted product as a carpet product.

9. Process of Claim 8, wherein said nonstick release agent comprises polytetrafluoroethylene.

References Cited
UNITED STATES PATENTS

| | | | |
|---|---|---|---|
| 3,573,964 | 4/1971 | Jones | 156—79 |
| 3,709,768 | 1/1973 | Stumpf | 156—72 |
| 3,537,946 | 11/1970 | Truax et al. | 161—67 |
| 3,028,279 | 4/1962 | Heberlein | 161—76 |
| 3,150,024 | 9/1964 | Penman | 156—229 |
| 3,615,973 | 10/1971 | Meeder | 156—79 |
| 3,576,696 | 4/1971 | Normanton | 156—229 |
| 2,768,671 | 10/1956 | Schock | 161—67 |

DANIEL J. FRITSCH, Primary Examiner

U.S. Cl. X.R.

156—79, 229, 289, 331, 499